(12) United States Patent
Yoshihara et al.

(10) Patent No.: US 11,448,465 B2
(45) Date of Patent: Sep. 20, 2022

(54) HEAT EXCHANGER

(71) Applicant: NGK INSULATORS, LTD., Nagoya (JP)

(72) Inventors: Makoto Yoshihara, Nagoya (JP); Tatsuo Kawaguchi, Nagoya (JP); Yutaro Fumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 128 days.

(21) Appl. No.: 16/787,394

(22) Filed: Feb. 11, 2020

(65) Prior Publication Data

US 2020/0309463 A1 Oct. 1, 2020

(30) Foreign Application Priority Data

Mar. 26, 2019 (JP) .............................. JP2019-059083

(51) Int. Cl.

| *F28D 7/00* | (2006.01) |
|---|---|
| *F28D 7/10* | (2006.01) |
| *F28D 21/00* | (2006.01) |
| *F28F 1/02* | (2006.01) |
| *F28F 27/00* | (2006.01) |

(52) U.S. Cl.
CPC ........... *F28D 7/0008* (2013.01); *F28D 7/103* (2013.01); *F28F 1/022* (2013.01); *F28F 27/00* (2013.01); *F28D 21/0003* (2013.01)

(58) Field of Classification Search
CPC .. F28F 21/003; F28F 7/10; F28F 7/103; F28F 7/106; F28F 27/02; F01N 3/035; F01N 5/02; F01N 3/025; F01N 2240/36; F01N 2240/02; F28D 21/0003; F28D 2021/008; F28D 7/0008
See application file for complete search history.

(56) References Cited

U.S. PATENT DOCUMENTS

| 5,345,762 A * | 9/1994 | Lutze .................... F01N 3/2006 60/288 |
| 9,739,540 B2 * | 8/2017 | Yoshida ................. F28F 1/003 |
| 2008/0029655 A1 * | 2/2008 | Mabuchi .................... F01N 5/02 248/58 |

(Continued)

FOREIGN PATENT DOCUMENTS

| JP | 2012-037165 A1 | 2/2012 |
| JP | 2018-119418 A1 | 8/2018 |
| WO | WO-2017069265 A1 * | 4/2017 ............... F01N 3/24 |

*Primary Examiner* — Jianying C Atkisson
*Assistant Examiner* — For K Ling
(74) *Attorney, Agent, or Firm* — Burr & Brown, PLLC

(57) ABSTRACT

A heat exchanger including a honeycomb structure having partition walls defining fluid cells extending between inflow and outflow end faces, and inner and outer peripheral walls. A first outer cylinder contacts the outer peripheral wall. A first inner cylinder having inflow and outflow ports for the fluid has an outer peripheral surface that contacts the inner peripheral wall. A second inner cylinder having inflow and outflow ports for the fluid is spaced on a radially inner side of the inner peripheral wall. The inflow port of the first inner cylinder is closer to the inflow end face than the outflow end face in an axial direction of the honeycomb structure. The outflow port of the second inner cylinder is closer to the outflow end face than the inflow end face in the axial direction of the honeycomb structure.

10 Claims, 6 Drawing Sheets

(56) References Cited

U.S. PATENT DOCUMENTS

| | | | | |
|---|---|---|---|---|
| 2010/0043413 | A1* | 2/2010 | Orihashi | F28F 1/14 |
| | | | | 60/320 |
| 2010/0146954 | A1* | 6/2010 | Sloss | F02D 9/04 |
| | | | | 60/320 |
| 2011/0302910 | A1* | 12/2011 | Burgers | F28D 7/103 |
| | | | | 60/299 |
| 2013/0276437 | A1* | 10/2013 | Iwasaki | F01N 3/0256 |
| | | | | 60/303 |
| 2014/0208725 | A1* | 7/2014 | Schweizer | F01N 13/16 |
| | | | | 60/320 |
| 2015/0219236 | A1* | 8/2015 | Seon | F16K 31/002 |
| | | | | 165/297 |
| 2016/0341489 | A1* | 11/2016 | Ichiyanagi | F28D 7/005 |
| 2017/0268401 | A1* | 9/2017 | Okami | F02G 5/02 |
| 2017/0343302 | A1* | 11/2017 | Ishikawa | F28D 21/0003 |
| 2018/0230884 | A1* | 8/2018 | Kawaguchi | F01N 3/24 |

* cited by examiner

100

HEAT EXCHANGER

FIELD OF THE INVENTION

The present invention relates to a heat exchanger.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

A such systems, for example, there is a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

Patent Document 1 proposes a heat exchanger including: a heat collecting portion formed as a honeycomb structure having a plurality of cells through which a first fluid (for example, an exhaust gas) can flow; and a casing arranged to cover an outer peripheral surface of the heat collecting portion, through which a second fluid (for example, cooling water) can flow between the heat collecting portion and the casing.

However, the heat exchanger of Patent Document 1 has a structure in which waste heat from the first fluid to the second fluid is constantly collected. Therefore, even if there is no need to collect the waste heat (even if the heat exchange is not needed), the waste heat might be collected. Therefore, the heat exchanger has been required to increase a capacity of a radiator for discharging the collected waste heat even if there has been no need to collect the waste heat.

On the other hand, Patent Document 2 proposes a heat exchanger (an exhaust heat recovery device) including: an inner pipe for allowing an exhaust gas from an engine to flow to a rear side of a vehicle; an outer pipe disposed on an outer peripheral portion of the inner pipe in an axial direction of the inner pipe, the outer pipe extending to a more rear side of the vehicle than a rear end of the inner pipe; a valve for opening and closing the rear end of the inner pipe; a first restricting portion having an inflow port that opens toward the rear side of the vehicle with respect to an interior of the inner pipe, the first restricting portion allowing the exhaust gas flowing from the interior of the inner pipe through the inflow port to flow toward a front side of the vehicle, and guiding the exhaust gas to a radially outward side of the inner pipe through a hole formed in the inner pipe; a flow path formed between the inner pipe and the outer pipe, the flow path allowing the exhaust gas guided to the radially outward side of the inner pipe through the hole to flow toward the rear side of the vehicle on a radially outward side of the inner pipe; a heat exchange portion disposed radially outside the inner pipe, the heat exchanging portion exchanging heat between the exhaust gas flowing through the flow path and a refrigerant; and a second restricting provided on a more downstream side than the heat exchange portion in a flow direction in the flow path.

The heat exchanger of Patent Document 2 can perform switching between promotion and suppression of heat recovery (heat exchange) by opening and closing the valve. In particular, the heat exchanger is provided with the first restricting portion and the second restricting portion, so that heat insulation performance can be improved as a result of difficulty for the exhaust gas to flow in the heat exchanger portion by opening the rear end of the inner pipe (opening the valve) during the suppression of heat recovery.

CITATION LIST

Patent Literatures

Patent Document 1: Japanese Patent Application Publication No. 2012-037165 A

Patent Document 2: Japanese Patent Application Publication No. 2018-119418 A

SUMMARY OF THE INVENTION

The present invention relates to a heat exchanger, comprising:

a hollow pillar shaped honeycomb structure having partition walls, an inner peripheral wall, and an outer peripheral wall, the partition walls defining a plurality of cells to form flow paths for a first fluid, each of the cells extending from an inflow end face to an outflow end face;

a first outer cylinder arranged to be in contact with the outer peripheral wall of the hollow pillar shaped honeycomb structure;

a first inner cylinder having an inflow port and an outflow port for the first fluid, the first inner cylinder being arranged such that a part of an outer peripheral surface of the first inner cylinder is in contact with the inner peripheral wall;

a second inner cylinder having an inflow port and an outflow port for the first fluid, the outflow port being arranged so as to be spaced on a radially inner side of the inner peripheral wall; and an on-off valve arranged on the outflow port side of the first inner cylinder, wherein the inflow port of the first inner cylinder is positioned closer to the inflow end face side than the outflow end face in an axial direction of the hollow pillar shaped honeycomb structure;

wherein the outflow port of the second inner cylinder is positioned closer to the outflow end face side than the inflow end face in the axial direction of the hollow pillar shaped honeycomb structure; and wherein the outflow port of the second inner cylinder has a diameter smaller than that of the inflow port of the first inner cylinder.

According to the present invention, it is possible to provide a heat exchanger which can improve heat recovery performance without affecting pressure loss during the promotion of heat recovery, and improve heat insulation performance during the suppression of heat recovery.

DETAILED DESCRIPTION OF THE INVENTION

As a result of studies, the present inventors have found that the heat exchanger of Patent Document 2 is provided with the first restricting portion and the second restricting portion and thus causes a problem that when the rear end of the inner pipe is closed (when the valve is closed) during the promotion of heat recovery, it is also difficult for the exhaust gas to flow from the inner pipe to the heat exchange portion, resulting in decreased heat recovery performance and leading to an easily increase in pressure loss.

The present invention has been made to solve the above problems. An object of the present invention is to provide a heat exchanger which can improve heat recovery performance without affecting pressure loss during the promotion of heat recovery, and improve heat insulation performance during the suppression of heat recovery.

As results of intensive studies of a structure of a heat exchanger, the present inventors have found that a heat exchanger having a specific structure can solve the above problems, and have completed the present invention.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Figure 1:
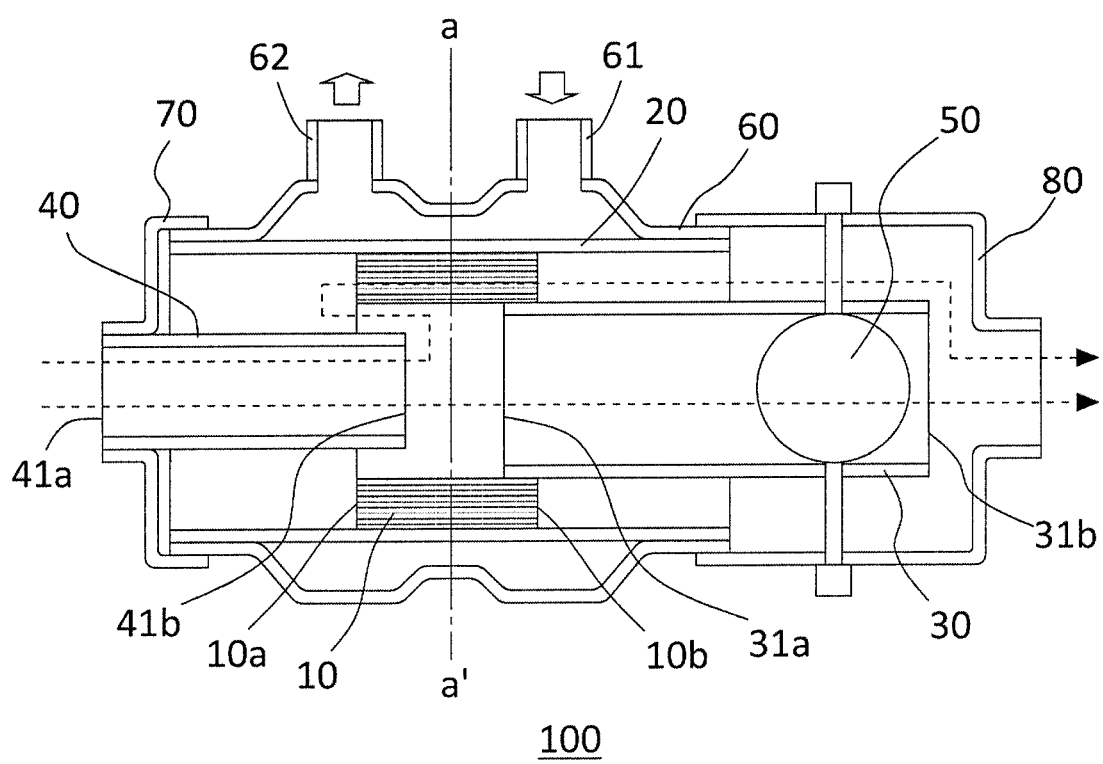
FIG. 1 is a cross-sectional view of a heat exchanger according to an embodiment of the present invention, which is parallel to a flow direction of a first fluid.
Figure 2:
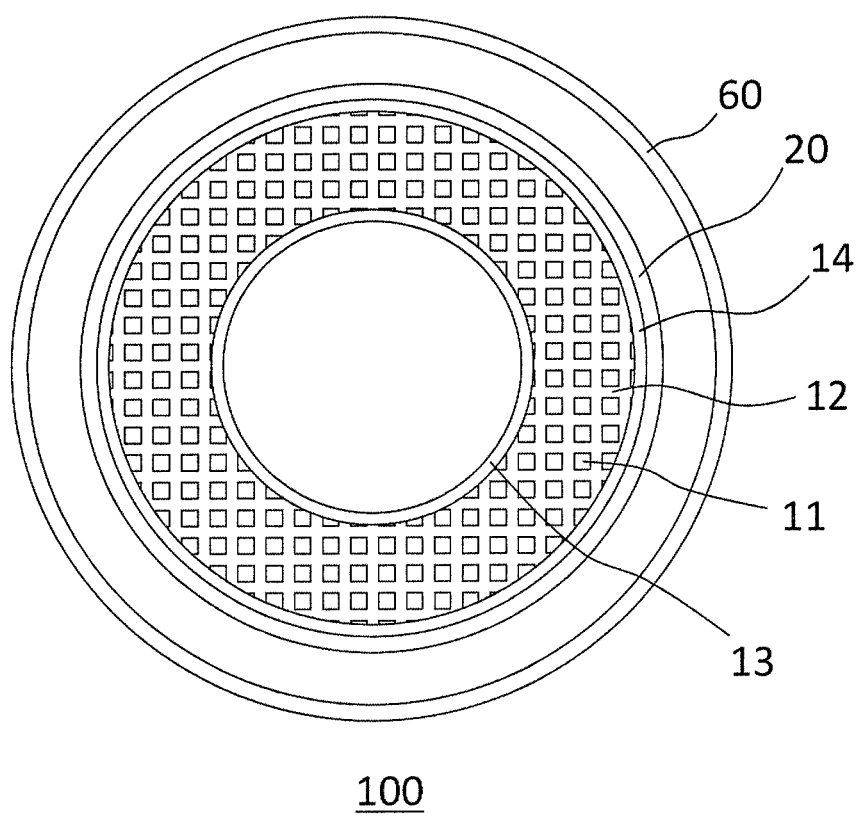
FIG. 2 is a cross-sectional view taken along the line a-a' in the heat exchanger of FIG. 1.

FIG. 1 is a cross-sectional view of a heat exchanger according to an embodiment of the present invention, which is parallel to a flow direction of a first fluid. FIG. 2 is a cross-sectional view taken along the line a-a' in the heat exchanger of FIG. 1.

As shown in FIG. 1, a heat exchanger 100 according to an embodiment of the present invention includes: a hollow pillar shaped honeycomb structure 10 (which may be, hereinafter, abbreviated as a "pillar shaped honeycomb structure"); a first outer cylinder 20 disposed so as to be in contact with an outer peripheral wall 14 of the pillar shaped honeycomb structure 10; a first inner cylinder 30 arranged such that a part of an outer peripheral surface of the first inner cylinder 30 is in contact with an inner peripheral wall 13 of the pillar shaped honeycomb structure 10; and a second inner cylinder 40 having an outflow port 41b arranged so as to be spaced on a radially inner side of the inner peripheral wall 13 of the pillar shaped honeycomb structure 10; and an on-off valve 50 arranged on an outflow port 31b side of the first inner cylinder 30.

The hollow pillar shaped honeycomb structure 10 includes: partition walls 12, an inner peripheral wall 13; and an outer peripheral wall 14, and the partition walls 14 define a plurality of cells 11 forming flow paths for a first fluid, and each of the cells 11 extends from an inflow end face 10a to an outflow end face 10b.

As used herein, the "hollow pillar shaped honeycomb structure 10" refers to a pillar shaped honeycomb having a hollow region at a central portion in a cross section of the hollow pillar shaped honeycomb structure, which is perpendicular to a flow direction of the first fluid.

A shape (outer shape) of the hollow pillar shaped honeycomb structure 10 is not particularly limited, and it may be, for example, a circular pillar shape, an elliptical pillar shape, a quadrangular pillar shape, or other polygonal pillar shape.

Also, a shape of the hollow region in the hollow pillar shaped honeycomb structure 10 is not particularly limited, and it may be, for example, a circular pillar shape, an elliptical pillar shape, a quadrangular pillar shape, or other polygonal pillar shape.

It should be note that the shape of the hollow pillar shaped honeycomb structure 10 and the shape of the hollow region may be the same as or different from each other. However, they are preferably the same as each other, in terms of resistance to external impact, thermal stress, and the like.

Each of the cells 11 may have any shape, including, but not particularly limited to, circular, elliptical, triangular, quadrangular, hexagonal and other polygonal shapes in a cross section in a direction perpendicular to a flow path direction of the first fluid. Also, the cells 11 are radially provided in a cross section in a direction perpendicular to the flow path direction of the first fluid. Such a structure can allow heat of the first fluid flowing through the cells 11 to be efficiently transmitted to the outside of the hollow pillar shaped honeycomb structure 10.

A thickness of each partition wall 12 is not particularly limited, and it may preferably be from 0.1 to 1 mm, and more preferably from 0.2 to 0.6 mm. The thickness of the partition wall 12 of 0.1 mm or more can provide the hollow pillar shaped honeycomb structure 10 with a sufficient mechanical strength. Further, the thickness of the partition wall 5 of 1 mm or less can prevent problems that the pressure loss is increased due to a decrease in an opening area and the heat recovery efficiency is decreased due to a decrease in a contact area with the first fluid.

Each of the inner peripheral wall 13 and the outer peripheral wall 14 preferably has a thickness larger than that of the partition wall 12, although not particularly limited thereto. Such a structure can lead to increased strength of the inner peripheral wall 13 and the outer peripheral wall 14 which would otherwise tend to generate breakage (e.g., cracking, chinking, and the like) by external impact, thermal stress due to a temperature difference between the first fluid and the second fluid, and the like.

In addition, the thicknesses of the inner peripheral wall 13 and the outer peripheral wall 14 are not particularly limited, and they may be adjusted as needed according to applications and the like. For example, the thickness of each of the inner peripheral wall 13 and the outer peripheral wall 14 is preferably 0.3 mm or more and 10 mm or less, and more preferably from 0.5 mm to 5 mm, and even more preferably from 1 mm to 3 mm, when using the heat exchange 100 for general heat exchange applications. Moreover, when using the heat exchanger 100 for heat storage applications, the thickness of the outer peripheral wall 14 is preferably 10 mm or more, in order to increase a heat capacity of the outer peripheral wall 14.

The partition walls 12, the inner peripheral wall 13 and the outer peripheral wall 14 preferably contain ceramics as a main component. The phrase "contain ceramics as a main component" means that a ratio of a mass of ceramics to the masses of the total components is 50% by mass or more.

Each of the partition walls 12, the inner peripheral wall 13 and the outer peripheral wall 14 preferably has a porosity of 10% or less, and more preferably 5% or less, and even more preferably 3% or less, although not particularly limited thereto. Further, the porosity of the partition walls 12, the inner peripheral wall 13 and the outer peripheral wall 14 may be 0%. The porosity of the partition walls 12, the inner peripheral wall 13 and the outer peripheral wall 14 of 10% or less can lead to improvement of thermal conductivity.

The partition walls 12, the inner peripheral wall 13 and the outer peripheral wall 14 preferably contain SiC (silicon carbide) having high thermal conductivity as a main component. Examples of such a material includes Si-impregnated SiC, (Si+Al) impregnated SiC, a metal composite SIC, recrystallized SiC, $Si_3N_4$, SiC, and the like. Among them, Si-impregnated SiC and (Si+Al) impregnated SiC are preferably used because they can allow production at lower cost and have high thermal conductivity.

A cell density (that is, the number of cells 4 per unit area) in the cross section of the hollow pillar shaped honeycomb structure 10 perpendicular to the flow path direction of the first fluid is preferably in a range of from 4 to 320 cells/$cm^2$, although not particularly limited thereto. The cell density of 4 cells/$cm^2$ or more can sufficiently ensure the strength of the partition walls 12, hence the strength of the hollow pillar shaped honeycomb structure 10 itself and effective GSA (geometrical surface area). Further, the cell density of 320 cells/$cm^2$ or less can allow prevention of an increase in a pressure loss when the first fluid flows.

The hollow pillar shaped honeycomb structure 10 preferably has an isostatic strength of more than 100 MPa, and more preferably 150 MPa or more, and still more preferably 200 MPa or more, although not particularly limited thereto. The isostatic strength of the hollow pillar shaped honeycomb structure 10 of 100 MPa or more can lead to the hollow pillar shaped honeycomb structure 10 having improved durability. The isostatic strength of the hollow pillar shaped honeycomb structure 10 can be measured according to the method for measuring isostatic fracture strength as defied in the JASO standard M505-87 which is a motor vehicle standard issued by Society of Automotive Engineers of Japan, Inc.

A diameter (an outer diameter) of the outer peripheral wall 14 in the cross section in direction perpendicular to the flow path direction of the first fluid may preferably be from 20 to 200 mm, and more preferably from 30 to 100 mm, although not particularly limited thereto. Such a diameter can allow improvement of heat recovery efficiency. When the shape of the outer peripheral wall 14 is not circular, the diameter of the largest inscribed circle that is inscribed in the cross-sectional shape of the outer peripheral wall 14 is defined as the diameter of the outer peripheral wall 14.

Further, a diameter of the inner peripheral wall 13 in the cross section in the direction perpendicular to the flow path direction of the first fluid may preferably be from 1 to 50 mm, and more preferably from 2 to 30 mm, although not particularly limited thereto. When the cross-sectional shape of the inner peripheral wall 13 is not circular, the diameter of the largest inscribed circle that is inscribed in the cross-sectional shape of the inner peripheral wall 13 is defined as the diameter of the inner peripheral wall 13.

The hollow pillar shaped honeycomb structure 10 preferably has a thermal conductivity of 50 W/(m·K) or more at 25° C., and more preferably from 100 to 300 W/(m·K), and even more preferably from 120 to 300 W/(m K), although not particularly limited thereto. The thermal conductivity of the hollow pillar shaped honeycomb structure 10 in such a range can lead to an improved thermal conductivity and can allow the heat inside the hollow pillar shaped honeycomb structure 10 to be efficiently transmitted to the outside. It should be noted that the value of thermal conductivity is a value measured according to the laser flash method (JIS R 1611-1997).

In the case where an exhaust gas as the first fluid flows through the cells 11 in the hollow pillar shaped honeycomb structure 10, a catalyst may be supported on the partition walls 12 of the pillar shaped honeycomb structure 10. The supporting of the catalyst on the partition walls 12 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+ support) may preferably be from 10 to 400 g/L, although not particularly limited thereto. Further, when using the catalyst containing the noble metal(s), the supported amount may preferably be from 0.1 to 5 g/L, although not particularly limited thereto. The supported amount of the catalyst (catalyst metal+support) of 10 g/L or more can easily achieve catalysis. Also, the supported amount of the catalyst (catalyst metal+support) of 400 g/L or less can allow suppression of both an increase in a pressure loss and an increase in a manufacturing cost. The support refers to a carrier on which a catalyst metal is supported. Examples of the supports include those containing at least one selected from the group consisting of alumina, ceria and zirconia.

The first outer cylinder 20 is a cylindrical member, and is disposed so as to be in contact with the outer peripheral wall 14 of the pillar shaped honeycomb structure 10.

It is preferable that an axial direction of the first outer cylinder 20 coincides with that of the pillar shaped honeycomb structure 10, and a central axis of the first outer cylinder 20 coincides with that of the pillar shaped honeycomb structure 10. Further, diameters (an outer diameter and an inner diameter) of the first outer cylinder 20 may be uniform in the axial direction, but the diameter of at least a part (for example, both ends in the axial direction or the like) of the first outer cylinder may be reduced or expanded.

The first outer cylinder 20 is not particularly limited as long as it is in contact with the outer peripheral wall 14 of the hollow pillar shaped honeycomb structure 10. For example, as the first outer cylinder 20, it is possible to use a cylindrical member that is fitted into the outer peripheral wall 14 of the hollow pillar shaped honeycomb structure 10 to cover circumferentially the outer peripheral wall 14 of the hollow pillar shaped honeycomb structure 10.

As used herein, the "fitted" means that the hollow pillar shaped honeycomb structure 10 and the first outer cylinder 20 are fixed in a state of being suited to each other. Therefore, the fitting of the hollow pillar shaped honeycomb structure 10 and the first outer cylinder 20 encompasses cases where the hollow pillar shaped honeycomb structure 10 and the first outer cylinder 20 are fixed to each other by a fixing method based on fitting such as clearance fitting, interference fitting and shrinkage fitting, as well as by brazing, welding, diffusion bonding, or the like.

The first outer cylinder 20 may preferably have an inner surface shape corresponding to the outer peripheral wall 14 of the hollow pillar shaped honeycomb structure 10. Since the inner surface of the first outer cylinder 20 is in direct contact with the outer peripheral wall 14 of the hollow pillar shaped honeycomb structure 10, the thermal conductivity is improved and the heat in the hollow pillar shaped honeycomb structure 10 can be efficiently transferred to the first outer cylinder 20.

In terms of improvement of the heat recovery efficiency, a higher ratio of an area of a portion circumferentially covered with the first outer cylinder 20 in the outer peripheral wall 14 of the hollow pillar shaped honeycomb structure 10 to the total area of the outer peripheral wall 14 of the hollow pillar shaped honeycomb structure 10 is preferable. Specifically, the area ratio is preferably 80% or more, and more preferably 90% or more, and even more preferably 100% (that is, the entire outer peripheral wall 14 of the hollow pillar shaped honeycomb structure 10 is circumferentially covered with the first outer cylinder 20).

It should be noted that the term "outer peripheral wall 14" as used herein refers to a surface of the pillar shaped honeycomb structure 10, parallel to the flow path direction of the first fluid, and does not include surfaces (the inflow end face 10a and the outflow end face 10b) of the pillar shaped honeycomb structure 10, which are perpendicular to the flow path direction of the first fluid.

The first outer cylinder 20 is preferably made of a metal in terms of manufacturability, although not particularly limited thereto. Further, the metallic first outer cylinder 20 is also preferable in that it can be easily welded to a second outer cylinder 60 that will be described below. Examples of the material of the first outer cylinder 20 that can be used include stainless steel, titanium alloys, copper alloys, aluminum alloys, brass and the like. Among them, the stainless steel is preferable because it has high durability and reliability and is inexpensive.

The first outer cylinder 20 preferably has a thickness of 0.1 mm or more, and more preferably 0.3 mm or more, and still more preferably 0.5 mm or more, although not particularly limited thereto. The thickness of the first outer cylinder 20 of 0.1 mm or more can allow durability and reliability to be ensured. The thickness of the first outer cylinder 20 is preferably 10 mm or less, and more preferably 5 mm or less, and still more preferably 3 mm or less. The thickness of the first outer cylinder 20 of 10 mm or less can reduce thermal resistance and improve thermal conductivity.

The first inner cylinder 30 is a cylindrical member having an inflow port 31a and an outflow port 31b for the first fluid.

It is preferable that an axial direction of the first inner cylinder 30 coincides with that of the pillar shaped honeycomb structure 10, and a central axis of the first inner cylinder 30 coincides with that of the pillar shaped honeycomb structure 10. Further, diameters (an outer diameter and an inner diameter) of the first inner cylinder 30 may be uniform in the axial direction, but the diameter of at least a part (for example, around the outflow port 31b) of the first inner cylinder may be reduced or expanded.

The first inner cylinder 30 is not particularly limited as long as it can be housed in the inner peripheral wall 13 of the hollow pillar shaped honeycomb structure 10. For example, as the first inner cylinder 30, it is possible to use a cylindrical member in which a part of the outer peripheral surface of the first inner cylinder 30 is in contact with the inner peripheral wall 13 of the hollow pillar shaped honeycomb structure 10.

Here, a part of the outer peripheral surface of the first inner cylinder 30 and the inner peripheral wall 13 of the pillar shaped honeycomb structure 10 may be in direct contact with each other or in indirect contact with each other via other member.

The part of the first inner cylinder 30 and the inner peripheral wall 13 of the pillar shaped honeycomb structure are fixed to each other in a state where they are fitted to each other. A fixing method that can be used includes, but not limited to, fitting such as clearance fitting, interference fitting and shrinkage fitting, as well as brazing, welding, diffusion bonding, and the like.

The inflow port 31a of the first inner cylinder 30 is positioned closer to the inflow end face 10a side than the outflow end face 10b in the axial direction of the pillar shaped honeycomb structure 10. By providing the inflow port 31a of the first inner cylinder 30 at such a position, the first inner cylinder 30 can be fixed to the inner peripheral wall 13 of the pillar shaped honeycomb structure 10, and the flow path for the first fluid during suppression of heat recovery can be ensured.

Further, it is preferable that the inflow port 31a of the first inner cylinder 30 is positioned closer to the outflow end face 10b side than the inflow end face 10a in the axial direction of the pillar shaped honeycomb structure 10. That is, it is preferable that the inflow port 31a of the first inner cylinder 30 is positioned between the inflow end face 10a and the outflow end face 10b in the axial direction of the pillar shaped honeycomb structure 10. By providing the inflow port 31a of the first inner cylinder 30 at such a position, the narrowing of the flow path for the first fluid during promotion of heat recovery can be suppressed, so that the pressure loss does not easily increase.

The first inner cylinder 30 is preferably made of a metal in terms of manufacturability, although not particularly limited thereto. Examples of the material of the first inner cylinder 30 that can be used include stainless steel, titanium alloys, copper alloys, aluminum alloys, brass and the like. Among them, the stainless steel is preferable because it has high durability and reliability and is inexpensive.

The first inner cylinder 30 preferably has a thickness of 0.1 mm or more, and more preferably 0.3 mm or more, and still more preferably 0.5 mm or more, although not particularly limited thereto. The thickness of the first inner cylinder 30 of 0.1 mm or more can allow durability and reliability to be ensured. The thickness of the first inner cylinder 30 is preferably 10 mm or less, and more preferably 5 mm or less, and still more preferably 3 mm or less. The thickness of the first inner cylinder 30 of 10 mm or less can reduce the weight of the heat exchanger 100.

The second inner cylinder 40 is a cylindrical member having an inflow port 41a and an outflow port 41b for the first fluid. It is preferable that an axial direction of the second inner cylinder 40 coincides with that of the pillar shaped honeycomb structure 10, and a central axis of the second inner cylinder 40 coincides with that of the pillar shaped honeycomb structure 10.

The second inner cylinder 40 is not particularly limited as long as the inflow port 41a can be arranged so as to be spaced on a radially inner side of the inner peripheral wall 13 of the pillar shaped honeycomb structure 10. For example, as the second inner cylinder 40, it is possible to use a cylindrical member in which an outer diameter of the inflow port 41b is smaller than an inner diameter of the inner peripheral wall 13 o the pillar shaped honeycomb structure 10.

The diameter of the outflow port 41b of the second inner cylinder 40 is smaller than that of the inflow port 31a of the first inner cylinder 30. Such a structure can prevent the first inner cylinder 30 and the second inner cylinder 40 from coming into contact with each other, so that the flow path for the first fluid formed between the second inner cylinder 40 and the first inner cylinder 30 can be ensured.

A difference between the diameter (outer diameter) of the outflow port 41b of the second inner cylinder 40 and the diameter (inner diameter) of the inflow port 31a of the first inner cylinder 30 is preferably from 1 to 20 mm, and more preferably from 8 mm to 10 mm, although not particularly limited thereto. By controlling the difference of the diameters in such a range, an increase in pressure loss can be suppressed during promotion of heat recovery.

Figure 3:
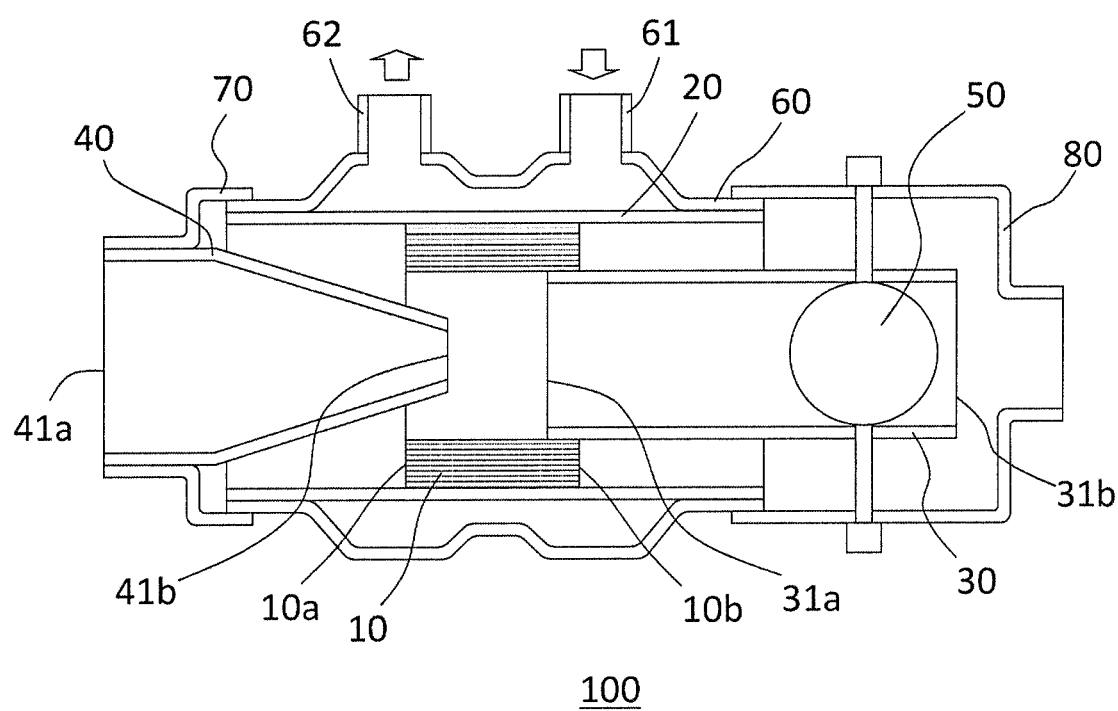
FIG. 3 is a cross-sectional view of other heat exchanger according to an embodiment of the present invention, which is parallel to a flow direction of a first fluid.

Diameters (an outer diameter and an inner diameter) of the second inner cylinder 40 may be uniform in the axial direction, but the diameter of at least a part (for example, around the inflow port 41a) of the second inner cylinder may be reduced or expanded. For example, as shown in FIG. 3, the second inner cylinder 40 preferably has a diameter of the inflow port 41a larger than the diameter of the outflow port 41b. Such a structure can suppress an increase in pressure loss.

The outflow port 41b of the second inner cylinder 40 is positioned closer to the outflow end face 10b than the inflow end face 10a in the axial direction of the pillar shaped honeycomb structure 10. By providing the outflow port 41b of the second inner cylinder 40 at such a position, the flow path direction of the first fluid toward the pillar shaped honeycomb structure 10 will be opposite to the flow direction of the first fluid in the second inner cylinder 40. Therefore, during suppression of heat recovery, the first fluid that has flowed out of the outflow port 41b of the second inner cylinder 40 easily flows in the inflow port 31a of the first inner cylinder 30 and hardly flows in the pillar shaped honeycomb structure 10. As a result, the heat insulation performance can be improved.

Figure 4:
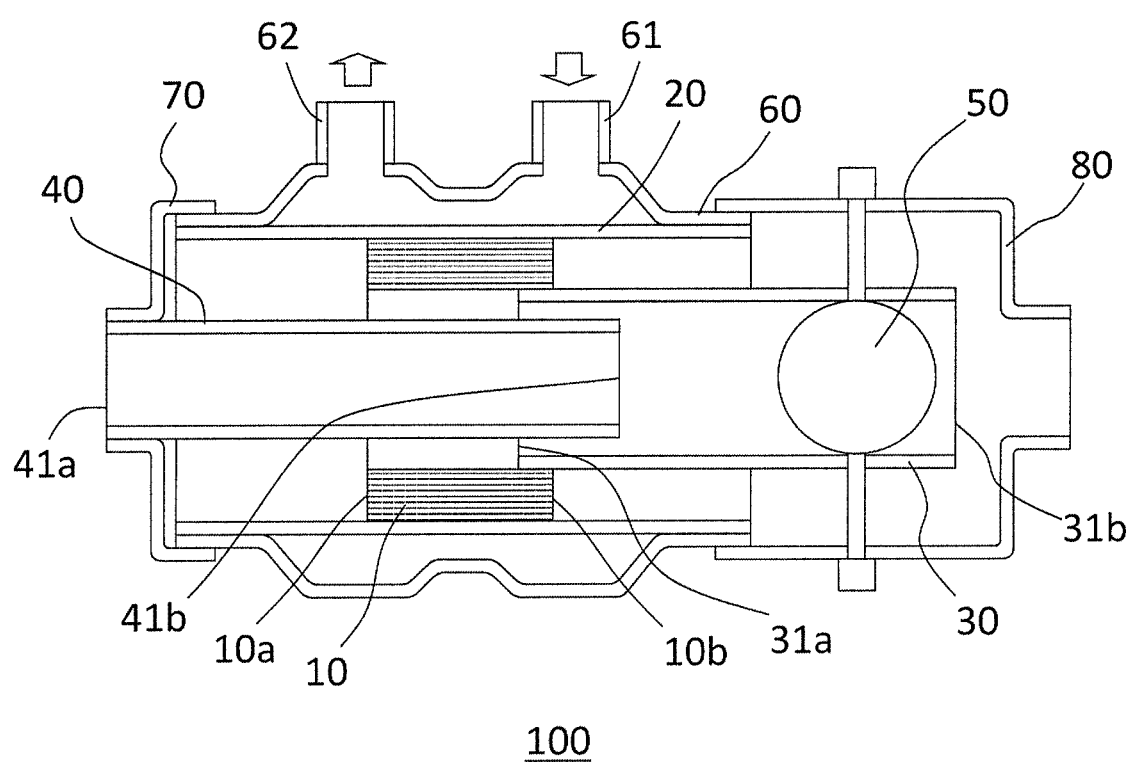
FIG. 4 is a cross-sectional view of other heat exchanger according to an embodiment of the present invention, which is parallel to a flow direction of a first fluid.

As shown in FIG. 4, the outflow port 41b of the second inner cylinder 40 may be positioned closer to the outflow port 31b side than the inflow port 31a of the first inner cylinder 30 in the axial direction of the first inner cylinder 30. The providing of the outflow port 41b of the second inner cylinder 40 at such a position results in a longer flow path of the first fluid, which is opposite to the flow direction of the first fluid in the second inner cylinder 40. Therefore, the heat insulation performance can be further improved.

As shown in FIG. 4, the outflow port 41b of the second inner cylinder 40 may extend beyond the outflow end face 10b of the pillar shaped honeycomb structure 10 in the axial direction of the pillar shaped honeycomb structure 10. The providing of the outflow port 41b of the second inner cylinder 40 at such a position results in a longer flow path of the first fluid, which is opposite to the flow direction of the first fluid in the second inner cylinder 40. Therefore, the heat insulation performance can be further improved.

Figure 5:
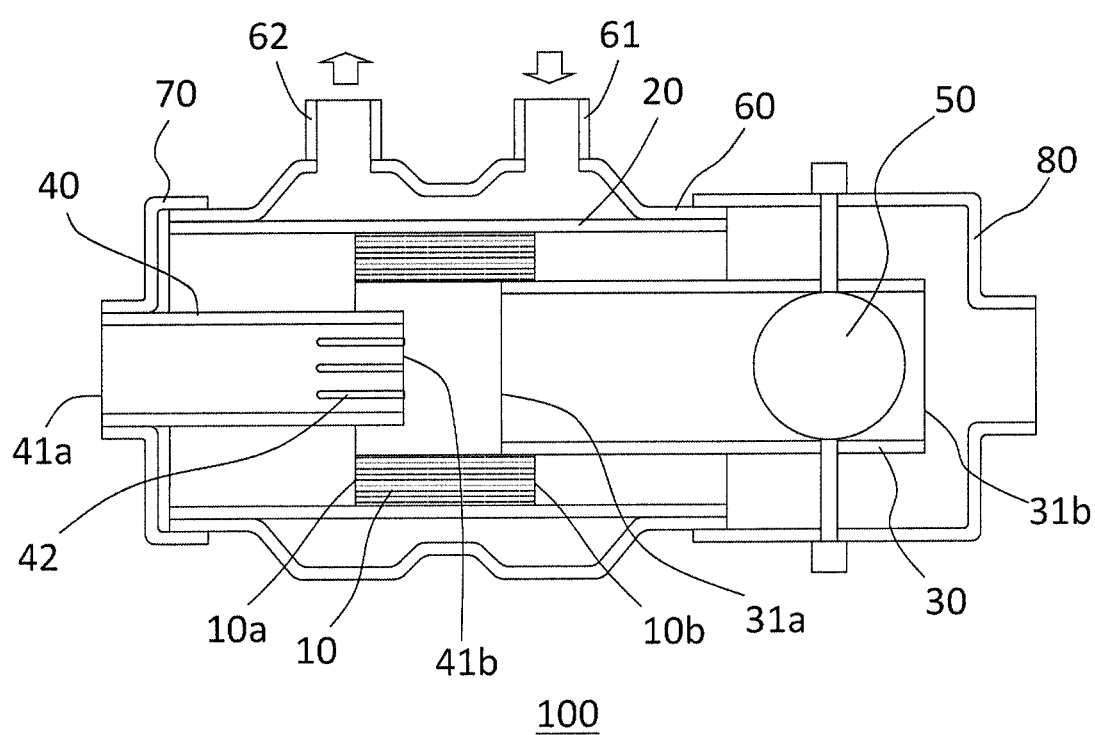
FIG. 5 is a cross-sectional view of other heat exchanger according to an embodiment of the present invention, which is parallel to a flow direction of a first fluid.

As illustrated in FIG. 5, the second inner cylinder 40 may have grooves 42 each extending in the axial direction of the second inner cylinder 40 on the outer peripheral surface on the outflow port 41b side. The grooves 42 are preferably provided in the entire circumferential direction of the second inner cylinder 40. By providing such grooves 42, the heat insulation performance can be further improved.

Figure 6:
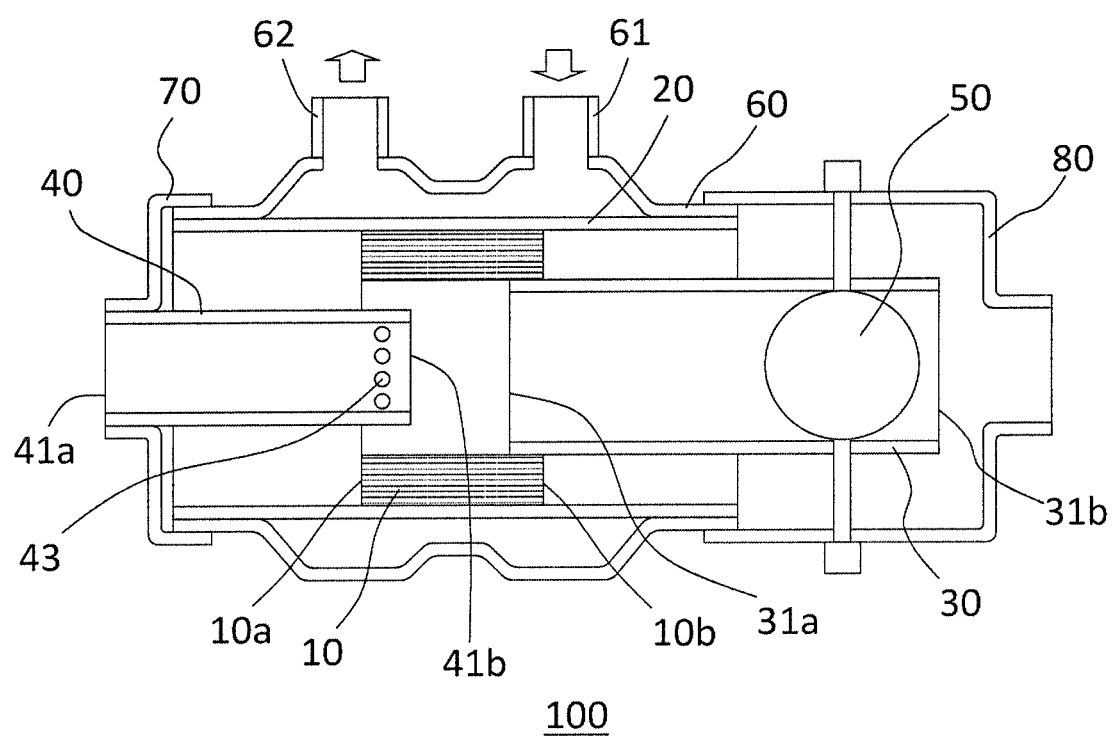
FIG. 6 is a cross-sectional view of other heat exchanger according to an embodiment of the present invention, which is parallel to a flow direction of a first fluid.

As shown in FIG. 6, the second inner cylinder 40 may have through holes 43 on the outflow port 41b side, which penetrates in the radial direction of the second inner cylinder 40. The through holes 43 are preferably provided in the entire circumferential direction of the second inner cylinder 40. By providing such through holes 43, the heat insulation performance can be further improved.

A method of fixing the second inner cylinder 40 is not particularly limited. For example, the second inner cylinder 40 may be fixed to a front cover 70 or the like. Here, the front cover 70 has a cylindrical shape, with one end in the axial direction fixed to an outer peripheral surface of a second outer cylinder 60 described later, and the other end of the axial direction fixed to the outer peripheral surface of the second inner cylinder 40. A fixing method that can be used includes, but not limited to, fitting such as clearance fitting, interference fitting and shrinkage fitting, as well as brazing, welding, diffusion bonding, and the like.

The second inner cylinder 40 is preferably made of a metal in terms of manufacturability, although not particularly limited thereto. Examples of the material of the second inner cylinder 40 that can be used include stainless steel, titanium alloys, copper alloys, aluminum alloys, brass and the like. Among them, the stainless steel is preferable because it has high durability and reliability and is inexpensive.

The second inner cylinder 40 preferably has a thickness of 0.1 mm or more, and more preferably 0.3 mm or more, and still more preferably 0.5 mm or more, although not particularly limited thereto. The thickness of the second inner cylinder 40 of 0.1 mm or more can allow durability and reliability to be ensured. The thickness of the second inner cylinder 40 is preferably 10 mm or less, and more preferably 5 mm or less, and still more preferably 3 mm or less. The thickness of the second inner cylinder 40 of 10 mm or less can reduce the weight of the heat exchanger 100.

An on-off valve 50 is arranged on the outflow port 31b side of the first inner cylinder 30. The on-off valve 50 is configured to be able to shut off the flow of the first fluid inside the first inner cylinder 30 during heat exchange (during promotion of heat recovery). Further, the on-off valve 50 is configured to be able to release the flow of the first fluid inside the first inner cylinder 30 during non-heat exchange (during suppression of heat recovery). That is, the on-off valve 50 can allow the first fluid to flow through the pillar shaped honeycomb structure 10 by closing the on-off valve 50 during promotion of heat recovery, and can allow the first fluid to flow through the first inner cylinder 30 by opening the on-off valve 50.

The shape and structure of the on-off valve 50 are not particularly limited, and they may be selected depending on the shape of the first inner cylinder 30 in which the on-off valve 50 is provided.

The heat exchanger 100 according to an embodiment of the present invention can further include a second outer cylinder 60 that is disposed so as to be spaced on a radially outer side of the first outer cylinder 20, and can allow a second fluid to flow between the second outer cylinder 60 and the first outer cylinder 20.

The second outer cylinder 60 is a cylindrical member. It is preferable that an axial direction of the second outer cylinder 60 coincides with that of the pillar shaped honeycomb structure 10, and a central axis of the second outer cylinder 60 coincides with that of the pillar shaped honeycomb structure 10.

The second outer cylinder 60 is preferably connected to both a feed pipe 61 for feeding the second fluid to a region between the second outer cylinder 60 and the first outer cylinder 20, and a discharge pipe 62 for discharging the second fluid to a region between the second outer cylinder 60 and the first outer cylinder 20. The feed pipe 61 and the discharge pipe 62 are preferably provided at positions corresponding to both axial ends of the pillar shaped honeycomb structure 10, respectively.

The feed pipe 61 and the discharge pipe 62 may extend in the same direction, or may extend in different directions.

The second outer cylinder 60 is preferably arranged such that inner peripheral surfaces at both ends in the axial direction are in direct or indirect contact with the outer peripheral surface of the first outer cylinder 20.

A method of fixing the inner peripheral surfaces at the both ends in the axial direction to the outer peripheral surface of the first outer cylinder 20 that can be used includes, but not limited to, fitting such as clearance fitting, interference fitting and shrinkage fitting, as well as brazing, welding, diffusion bonding, and the like.

Diameters (an outer diameter and an inner diameter) of the second outer cylinder 60 may be uniform in the axial direction, but the diameter of at least a part (for example, a central portion in the axial direction, both ends in the axial direction, or the like) of the second outer cylinder may be reduced or expanded. For example, by reducing the diameter of the central portion in the axial direction of the second outer cylinder 60, the second fluid can spread throughout the outer peripheral direction of the first outer cylinder 20 in the second outer cylinder 60 on the feed pipe 61 and discharge pipe 62 sides. Therefore, an amount of the second fluid that does not contribute to the heat exchange at the central portion in the axial direction is reduced, so that the heat exchange efficiency can be improved.

The second outer cylinder 60 is preferably made of a metal in terms of manufacturability, although not particularly limited thereto. Examples of the material of the second outer cylinder 60 that can be used include stainless steel, titanium alloys, copper alloys, aluminum alloys, brass and the like. Among them, the stainless steel is preferable because it has high durability and reliability and is inexpensive.

The second outer cylinder 60 preferably has a thickness of 0.1 mm or more, and more preferably 0.3 mm or more, and still more preferably 0.5 mm or more, although not particularly limited thereto. The thickness of the second outer cylinder 60 of 0.1 mm or more can allow durability and reliability to be ensured. The thickness of the second outer cylinder 60 is preferably 10 mm or less, and more preferably 5 mm or less, and still more preferably 3 mm or less. The thickness of the second outer cylinder 60 of 10 mm or less can reduce the weight of the heat exchanger 100.

It is preferable that for the second outer cylinder 60, an outer peripheral surface at one axial end is fixed to the inner peripheral surface of the above front cover 70, and an outer peripheral surface at the other axial end is fixed to an inner peripheral surface of a back cover 80. Such a structure can allow the inflow and outflow of the first fluid to and from the heat exchanger 100 to be ensured. A fixing method that can be used includes, but not limited to, fitting such as clearance fitting, interference fitting and shrinkage fitting, as well as brazing, welding, diffusion bonding, and the like.

The first fluid and the second fluid used in the heat exchanger 100 are not particularly limited, and various liquids and gases can be used. For example, when the heat exchanger 100 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

The heat exchanger 100 having the above structure can be produced in accordance with a known method. For example, the heat exchanger 100 can be produced in accordance with the producing method as described below.

First, a green body containing ceramic powder is extruded into a desired shape to prepare a honeycomb formed body. At this time, the shape and density of the cells 11, and lengths and thicknesses of the partition walls 12, the inner peripheral wall 13 and the outer peripheral wall 14, and the like, can be controlled by selecting dies and jigs in appropriate forms. The material of the honeycomb formed body that can be used includes the ceramics as described above. For example, when producing a honeycomb formed body containing the Si-impregnated SiC composite as a main component, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the honeycomb formed body can be impregnated with metallic Si and fired under reduced pressure in an inert gas or vacuum to obtain a hollow pillar shaped honeycomb structure 10 having cells 11 defined by partition walls 12.

The hollow pillar shaped honeycomb structure 10 is then inserted into the first outer cylinder 20 and fixed at the predetermined position. The second outer cylinder 60 is then arranged at the predetermined position, and the inner peripheral surfaces at both axial ends of the second outer cylinder 60 are fixed to the outer peripheral surfaces at both axial ends of the first outer cylinder 20. The first inner cylinder 30 is then disposed at the predetermined position, and the outer peripheral surface of the first inner cylinder 30 on the inflow port 31a side is fixed to the inner peripheral wall 13 of the hollow pillar shaped honeycomb structure 10. The front cover 70 and the back cover 80 are then arranged at the predetermined positions, and the inner peripheral surfaces of the front cover 70 and the back cover 80 are fixed to the outer peripheral surface of the second outer cylinder 60. The second inner cylinder 40 is then arranged at the predetermined position, and the outer peripheral surface of the second inner cylinder 40 is fixed to the inner peripheral surface of the front cover 70. The on-off valve 50 is then attached to the first inner cylinder 30 on the outflow port 31b side.

In addition, the feed pipe 61 and the discharge pipe 62 may be previously fixed to the second outer cylinder 60. However, they may be fixed to the second outer cylinder 60 at an appropriate stage. Further, the arranging and fixing orders of the respective members are not limited to the above orders, and they may be changed as needed within a range in which the members can be produced. As the fixing method, the above method may be used.

The heat exchanger 100 according to the embodiment of the present invention is configured such that the flow path direction of the first fluid toward the pillar shaped honeycomb structure 10 is opposite to the flow direction of the first fluid in the second inner cylinder 40 during suppression of heat recovery. Therefore, it is difficult for the first fluid to flow in the pillar shaped honeycomb structure 10, so that the heat insulation performance can be improved. On the other hand, during promotion of heat recovery, it is configured such that the flow path for the first fluid is not narrowed, so that the first fluid can easily flow in the pillar shaped honeycomb structure 10 and the heat recovery performance can be improved without affecting the pressure loss.

EXAMPLES

Hereinafter, the present invention will be more specifically described with reference to Examples, but the present invention is not limited to these Examples.

<Production of Hollow Pillar Shaped Honeycomb Structure>

A green body containing SiC powder was extrusion-molded into a desired shape, and then dried, processed to have predetermined external dimensions, and impregnated with Si and fired to produce a hollow pillar shaped honeycomb structure. The hollow pillar shaped honeycomb structure had set dimensions: an outer diameter of 75 mm, a diameter of the hollow region of 57 mm, a length in the flow path direction of the first fluid of 33 mm, a thickness of each partition wall of 0.3 mm, a thickness of the inner peripheral wall of 1.5 mm, and a thickness of the outer peripheral wall of 1.5 mm. The hollow pillar shaped honeycomb structure had settings: a porosity of 1% for the partition walls, the inner peripheral wall and the outer peripheral wall, a cell density of 300 cells/cm$^2$, an isostatic strength of 150 MPa, and a thermal conductivity at 25° C. of 150 W/(m·K).

<Production of Heat Exchanger>

Example 1

Using the hollow pillar shaped honeycomb structure produced as described above, a heat exchanger having the structure as shown in FIGS. 1 and 2 was produced by the method as described above. The respective members of the heat exchanger were made of stainless steel, and their thicknesses were from 1 to 1.5 mm. The difference between the diameter (outer diameter) of the outflow port of the second inner cylinder and the diameter (inner diameter) of the inflow port of the first inner cylinder was 10 mm.

Comparative Example 1

Using the hollow pillar shaped honeycomb structure produced as described above, a heat exchanger having a structure as described in WO 2017/069265 was produced.

The heat exchangers obtained in Example and Comparative Example as described above were evaluated for heat recovery efficiency and pressure loss during promotion of heat recovery and during suppression of heat recovery. The pressure loss and the heat recovery efficiency were evaluated as follows.

(Heat Recovery Efficiency)

Air was used as the first fluid and water was used as the second fluid. Air at 400° C. (Tg1) was fed at a flow rate of 20 g/sec (Mg) to the second inner cylinder, and water was fed at a flow rate of 166 g/sec (Mw) between the first outer cylinder and the second outer cylinder through the feed pipe, and water after heat exchange was recovered from the discharge pipe.

Immediately after passing air and water through the heat exchanger for 5 minutes from the start of feeding under the above conditions, a temperature (Tw1) of water in the feed pipe and a temperature (Tw2) of water in the discharge pipe were measured to obtain a heat recovery efficiency. Here, a heat quantity Q recovered by water is expressed by the following equation:

$$Q(kW) = \Delta Tw \times Cpw \times Mw, \text{ with:}$$

$\Delta Tw = Tw2 - Tw1$, and Cpw (specific heat of water) = 4182 J/(kg·K).

Also, the heat recovery efficiency η of the heat exchanger is expressed by the following equation:

$$\eta(\%) = Q/\{(Tg1 - Tw1) \times Cpg \times Mg\} \times 100, \text{ with:}$$

Cpg (specific heat of air) = 1050 J/(kg·K).

<Pressure Loss>

In the above heat exchanging test for the heat recovery efficiency, pressure gauges were disposed in the flow path for air located upstream and downstream of the heat exchanger, respectively to measure pressures. A difference between these measured pressures was defined as the pressure loss of the air flowing through the heat exchanger. It should be noted that the pressures are measured values immediately after passing air and water through the heat exchanger for 5 minutes after starting the feeding of air and water.

The evaluation results are shown in Table 1.

TABLE 1

| | Example 1 | Comparative Example 1 |
|---|---|---|
| Heat Recovery Efficiency during Promotion of Heat Recovery (%) | 54 | 52 |
| Pressure Loss during Promotion of Heat Recovery (kPa) | 3 | 5 |
| Heat Recovery Efficiency during Suppression of Heat Recovery (%) | 5 | 8 |
| Pressure Loss during Suppression of Heat Recovery (kPa) | 0.11 | 0.08 |

As shown in Table 1, the heat exchanger of Example 1 has a lower pressure loss and a higher heat recovery efficiency during promotion of heat recovery, and also has a lower heat recovery efficiency during suppression of heat recovery, than those of the heat exchanger of Comparative Example 1.

As can be seen from the above results, according to the present invention, it is possible to provide a heat exchanger which can improve the heat recovery performance without affecting the pressure loss during promotion of heat recovery, and improve the heat insulation performance during suppression of heat recovery.

DESCRIPTION OF REFERENCE NUMERALS 10 pillar shaped honeycomb structure
10$a$ inflow end face
10$b$ outflow end face
11 cell
12 partition wall
13 inner wall
14 outer wall
20 first outer cylinder
30 first inner cylinder
31$a$ inflow port
31$b$ outflow port
40 second inner cylinder
41$a$ inflow port
41$b$ outflow port
50 on-off valve
60 second outer cylinder
61 feed pipe
62 discharge pipe
70 front cover
80 back cover
100 heat exchanger

The invention claimed is:
1. A heat exchanger, comprising:
a hollow pillar shaped honeycomb structure having partition walls, an inner peripheral wall, and an outer peripheral wall, the partition walls defining a plurality of cells to form flow paths for a first fluid, each of the cells extending from an inflow end face to an outflow end face;

a first outer cylinder arranged to be in contact with the outer peripheral wall of the hollow pillar shaped honeycomb structure;

a first inner cylinder having an inflow port and an outflow port for the first fluid, the first inner cylinder being arranged such that a part of an outer peripheral surface of the first inner cylinder is in contact with the inner peripheral wall of the hollow pillar shaped honeycomb structure;

a second inner cylinder having an inflow port and an outflow port for the first fluid, the outflow port being arranged so as to be spaced on a radially inner side of the inner peripheral wall of the hollow pillar shaped honeycomb structure; and an on-off valve arranged on a side of the outflow port of the first inner cylinder, wherein the inflow port of the first inner cylinder is arranged at a predetermined position that is downstream from the inflow end face so as to be closer to the outflow end face than the inflow end face in an axial direction of the hollow pillar shaped honeycomb structure, and the inflow end face of the first inner cylinder is fixed to the inner peripheral wall of the hollow pillar shaped honeycomb structure at the predetermined position;

wherein the outflow port of the second inner cylinder is positioned closer to the outflow end face than the inflow end face in the axial direction of the hollow pillar shaped honeycomb structure; and wherein the outflow port of the second inner cylinder has a diameter and the inflow port of the first inner cylinder has a diameter such that the diameter of the outflow port of the second inner cylinder is smaller than the diameter of the inflow port of the first inner cylinder.

2. The heat exchanger according to claim 1, wherein the heat exchanger further comprises a second outer cylinder disposed so as to be spaced on a radially outer side of the first outer cylinder, the second outer cylinder enabling a second fluid to flow between the second outer cylinder and the first outer cylinder.

3. The heat exchanger according to claim 1, wherein the on-off valve is configured to shut off a flow of the first fluid inside the first inner cylinder during heat exchange.

4. The heat exchanger according to claim 1, wherein grooves each extending in the axial direction of the second inner cylinder are formed on an outer peripheral surface of the second inner cylinder on a side of the outflow port.

5. The heat exchanger according to claim 1, wherein through holes each penetrating in a radial direction of the second inner cylinder are formed on a side of the outflow port of the second inner cylinder.

6. The heat exchanger according to claim 1, wherein the second inner cylinder has a diameter of the inflow port larger than that of the outflow port.

7. The heat exchanger according to claim 1, wherein the outflow port of the second inner cylinder is positioned closer to a side of the outflow port than a side of the inflow port of the first inner cylinder in the axial direction of the first inner cylinder.

8. The heat exchanger according to claim 1, wherein the outflow port of the second inner cylinder extends beyond the outflow end face of the hollow pillar shaped honeycomb structure in the axial direction of the hollow pillar shaped honeycomb structure.

9. The heat exchanger according to claim 1, wherein the first inner cylinder is arranged such that a part of an outer peripheral surface of the inflow port of the first inner cylinder is in contact with a side of the outflow end face of the inner peripheral wall of the hollow pillar shaped honeycomb structure and not in contact with a side of the inflow end face of the inner peripheral wall of the hollow pillar shaped honeycomb structure, and the second inner cylinder is arranged such that the outflow port of the second inner cylinder is spaced apart from a radially inner side of both the inner peripheral wall of the hollow pillar shaped honeycomb structure and the inflow port of the first inner cylinder.

10. The heat exchanger according to claim 1, wherein a side of the outflow port of the second inner cylinder has an outer diameter that is smaller than an inner diameter of a side of the inflow port of the first inner cylinder, and wherein the side of the outflow port of the second inner cylinder is spaced apart from and not in contact with the side of the inflow port of the first cylinder.

* * * * *